United States Patent
Van Der Schaar et al.

(10) Patent No.: US 6,940,905 B2
(45) Date of Patent: Sep. 6, 2005

(54) DOUBLE-LOOP MOTION-COMPENSATION FINE GRANULAR SCALABILITY

(75) Inventors: Mihaela Van Der Schaar, Ossining, NY (US); Hayder Radha, East Lansing, MI (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 755 days.

(21) Appl. No.: 09/887,743

(22) Filed: Jun. 21, 2001

(65) Prior Publication Data

US 2002/0037047 A1 Mar. 28, 2002

Related U.S. Application Data

(60) Provisional application No. 60/239,661, filed on Oct. 12, 2000, and provisional application No. 60/234,499, filed on Sep. 22, 2000.

(51) Int. Cl.$^7$ ................................................ H04N 7/12
(52) U.S. Cl. ................ 375/240.12; 382/236; 348/410.1
(58) Field of Search ........................ 375/240.12, 240.16, 375/240.18, 240.1, 240.15, 240.05; 708/203; 382/236; 348/487, 410.1, 397.1

(56) References Cited

U.S. PATENT DOCUMENTS

| | | | | |
|---|---|---|---|---|
| 5,349,383 A | * | 9/1994 | Parke et al. ............. | 375/240.1 |
| 5,742,343 A | * | 4/1998 | Haskell et al. ......... | 375/240.15 |
| 5,973,739 A | * | 10/1999 | Nilsson ................... | 375/240.1 |
| 5,988,863 A | * | 11/1999 | Demos ...................... | 708/203 |
| 6,256,346 B1 | * | 7/2001 | Yamaguchi et al. ... | 375/240.12 |
| 6,339,618 B1 | * | 1/2002 | Puri et al. .............. | 375/240.16 |

FOREIGN PATENT DOCUMENTS

EP     0485230 A2     11/1991     ............ H04N/7/13

OTHER PUBLICATIONS

M. Van Der Schaar et al.; "Embedded DCT and Wavelet Methods for Fine Granular Scalable Video: Analysis and Comparison", Proceedings of the SPIE, SPIE, Bellingham, VA, vol. 3974, Jan. 25–28, 2000, pp. 643–653, XP000981435.

* cited by examiner

*Primary Examiner*—Gims Philippe

(57) ABSTRACT

A video coding technique having motion compensation within a fine granular scalable coded enhancement layer. In one embodiment, the video coding technique involves a two-loop prediction-based enhancement layer including non-motion-predicted enhancement layer I- and P-frames and motion-predicted enhancement layer B-frames. The motion-predicted enhancement layer B-frames are computed using: 1) motion-prediction from two temporally adjacent differential I- and P- or P- and P-frame residuals, and 2) the differential B-frame residuals obtained by subtracting the decoded base layer B-frame residuals from the original base layer B-frame residuals. In a second embodiment, the enhancement layer further includes motion-predicted enhancement layer P-frames. The motion-predicted enhancement layer P-frames are computed using: 1) motion-prediction from a temporally adjacent differential I- or P-frame residual, and 2) the differential P-frame residual obtained by subtracting the decoded base layer P-frame residual from the original base layer P-frame residual.

31 Claims, 8 Drawing Sheets

DOUBLE-LOOP MOTION-COMPENSATION FINE GRANULAR SCALABILITY

RELATED APPLICATIONS

This application claims benefit of Ser. No. 60/239,661 filed Oct. 12, 2000, and claims benefit of Ser. No. 60/234,499 filed Sep. 22, 2000.

Commonly-assigned, copending U.S. patent application, Ser. No. 09/887,756 entitled "Single-Loop Motion-Compensation Fine Granular Scalability", filed Jun. 21, 2001.

Commonly-assigned, copending U.S. patent application, Ser. No. 09/930,672, entitled "Totally Embedded FGS Video Coding with Motion Compensation", filed Aug. 15, 2001.

FIELD OF THE INVENTION

The present invention relates to video coding, and more particularly to a scalable enhancement layer video coding scheme that employs motion compensation within the enhancement layer for bi-directional predicted frames (B-frames) and predicted frames and bi-directional predicted frames and (P- and B-frames).

BACKGROUND OF THE INVENTION

Scalable enhancement layer video coding has been used for compressing video transmitted over computer networks having a varying bandwidth, such as the Internet. A current enhancement layer video coding scheme employing fine granular scalable coding techniques (adopted by the ISO MPEG-4 standard) is shown in FIG. 1. As can be seen, the video coding scheme 10 includes a prediction-based base layer 11 coded at a bit rate $R_{BL}$, and an FGS enhancement layer 12 coded at $R_{EL}$.

The prediction-based base layer 11 includes intraframe coded I frames, interframe coded P frames which are temporally predicted from previous I- or P-frames using motion estimation-compensation, and interframe coded bi-directional B-frames which are temporally predicted from both previous and succeeding frames adjacent the B-frame using motion estimation-compensation. The use of predictive and/or interpolative coding i.e., motion estimation and corresponding compensation, in the base layer 11 reduces temporal redundancy therein.

The enhancement layer 12 includes FGS enhancement layer I-, P-, and B-frames derived by subtracting their respective reconstructed base layer frames from the respective original frames (this subtraction can also take place in the motion-compensated domain). Consequently, the FGS enhancement layer I-, P- and B-frames in the enhancement layer are not motion-compensated. (The FGS residual is taken from frames at the same time-instance.) The primary reason for this is to provide flexibility which allows truncation of each FGS enhancement layer frame individually depending on the available bandwidth at transmission time. More specifically, the fine granular scalable coding of the enhancement layer 12 permits an FGS video stream to be transmitted over any network session with an available bandwidth ranging from $R_{min}=R_{BL}$ to $R_{max}=R_{BL}+R_{EL}$. For example, if the available bandwidth between the transmitter and the receiver is B=R, then the transmitter sends the base layer frames at the rate $R_{BL}$ and only a portion of the enhancement layer frames at the rate $R_{EL}=R-R_{BL}$. As can be seen from FIG. 1, portions of the FGS enhancement layer frames in the enhancement layer can be selected in a fine granular scalable manner for transmission. Therefore, the total transmitted bit-rate is $R=R_{BL}+R_{EL}$. Because of its flexibility in supporting a wide range of transmission bandwidth with a single enhancement layer.

FIG. 2 shows a block-diagram of a conventional FGS encoder for coding the base layer 11 and enhancement layer 12 of the video coding scheme of FIG. 1. As can be seen, the enhancement layer residual of frame i (FGSR(i)) equals MCR(i)-MCRQ(i), where MCR(i) is the motion-compensated residual of frame i, and MCRQ(i) is the motion-compensated residual of frame i after the quantization and the dequantization processes.

Although the current FGS enhancement layer video coding scheme 10 of FIG. 1 is very flexible, it has the disadvantage that its performance in terms of video image quality is relatively low compared with that of a non-scalable coder functioning at the same transmission bit-rate. The decrease in image quality is not due to the fine granular scalable coding of the enhancement layer 12 but mainly due to the reduced exploitation of the temporal redundancy among the FGS residual frames within the enhancement layer 12. In particular, the FGS enhancement layer frames of the enhancement layer 12 are derived only from the motion-compensated residual of their respective base layer I-, P-, and B-frames, no FGS enhancement layer frames are used to predict other FGS enhancement layer frames in the enhancement layer 12 or other frames in the base layer 11.

Accordingly, a scalable enhancement layer video coding scheme is needed that employs motion-compensation in the enhancement layer to improve image quality while preserving most of the flexibility and attractive characteristics typical to the current FGS video coding scheme.

SUMMARY OF THE INVENTION

The present invention is directed to an enhancement layer video coding scheme, and in particular an FGS enhancement layer video coding scheme that employs motion compensation within the enhancement layer for predicted and bi-directional predicted frames. One aspect of the invention involves a method comprising the steps of: coding an uncoded video with a non-scalable codec to generate base layer frames; computing differential frame residuals from the uncoded video and the base layer frames, at least portions of certain ones of the differential frame residuals being operative as references; applying motion-compensation to the at least portions of the differential frame residuals that are operative as references to generate reference motion-compensated differential frame residuals; and subtracting the reference motion-compensated differential frame residuals from respective ones of the differential frame residuals to generate motion-predicted enhancement layer frames.

Another aspect of the invention involves a method comprising the steps of: decoding a base layer stream to generate base layer video frames; decoding an enhancement layer stream to generate differential frame residuals, at least portions of certain ones of the differential frame residuals being operative as references; applying motion-compensation to the at least portions of the differential frame residuals operative as references to generate reference motion-compensated differential frame residuals; adding the reference motion-compensated differential frame residuals with respective ones of the differential frame residuals to generate motion-predicted enhancement layer frames; and combining the motion-predicted enhancement layer frames with respective ones of the base layer frames to generate an enhanced video.

Still another aspect of the invention involves a memory medium for encoding video, which comprises code for non-scalable encoding an uncoded original video into base layer frames; code for computing differential frame residuals from the uncoded original video and the base layer frames, at least portions of certain ones of the differential frame residuals being operative as references; code for applying motion-compensation to the at least portions of the differential frame residuals that are operative as references to generate reference motion-compensated differential frame residuals; and code for subtracting the reference motion-compensated differential frame residuals from respective ones of the differential frame residuals to generate motion-predicted enhancement layer frames.

A further aspect of the invention involves a memory medium for decoding a compressed video having a base layer stream and an enhancement layer stream, which comprises: code for decoding the base layer stream to generate base layer video frames; code for decoding the enhancement layer stream to generate differential frame residuals, at least portions of certain ones of the differential frame residuals being operative as references; code for applying motion-compensation to the at least portions of the differential frame residuals operative as references to generate reference motion-compensated differential frame residuals; code for adding the reference motion-compensated differential frame residuals with respective ones of the differential frame residuals to generate motion-predicted enhancement layer frames; and code for combining the motion-predicted enhancement layer frames with respective ones of the base layer frames to generate an enhanced video.

Still a further aspect of the invention involves an apparatus for coding video, which comprises: means for non-scalable coding an uncoded original video to generate base layer frames; means for computing differential frame residuals from the uncoded original video and the base layer frames, at least portions of certain ones of the differential frame residuals being operative as references; means for applying motion-compensation to the at least portions of the differential frame residuals that are operative as references to generate reference motion-compensated differential frame residuals; and means for subtracting the reference motion-compensated differential frame residuals from respective ones of the differential frame residuals to generate motion-predicted enhancement layer frames.

Still another aspect of the invention involves an apparatus for decoding a compressed video having a base layer stream and an enhancement layer stream, which comprises: means for decoding the base layer stream to generate base layer video frames; means for decoding the enhancement layer stream to generate differential frame residuals, at least portions of certain ones of the differential frame residuals being operative as references; means for applying motion-compensation to the at least portions of the differential frame residuals operative as references to generate reference motion-compensated differential frame residuals; means for adding the reference motion-compensated differential frame residuals with respective ones of the differential frame residuals to generate motion-predicted enhancement layer frames; and means for combining the motion-predicted enhancement layer frames with respective ones of the base layer frames to generate an enhanced video.

BRIEF DESCRIPTION OF THE DRAWINGS

The advantages, nature, and various additional features of the invention will appear more fully upon consideration of the illustrative embodiments now to be described in detail in connection with accompanying drawings where like reference numerals identify like elements throughout the drawings.

DETAILED DESCRIPTION OF THE INVENTION

Figure 3A:
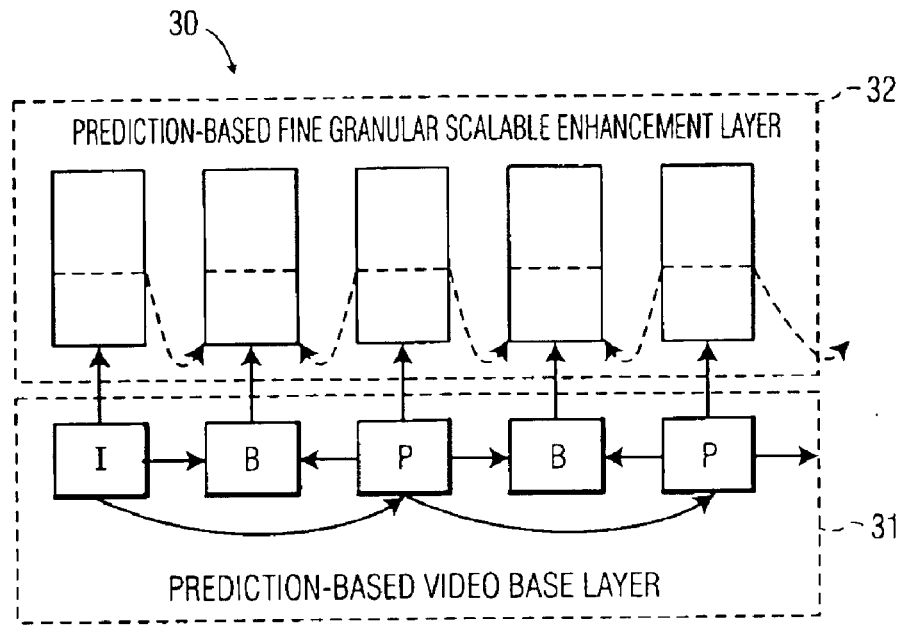
FIG. 3A shows an enhancement layer video coding scheme according to a first exemplary embodiment of the present invention.

FIG. 3A shows an enhancement layer video coding scheme 30 according to a first exemplary embodiment of the present invention. As can be seen, the video coding scheme 30 includes a prediction-based base layer 31 and a two-loop prediction-based enhancement layer 32.

Figure 1:
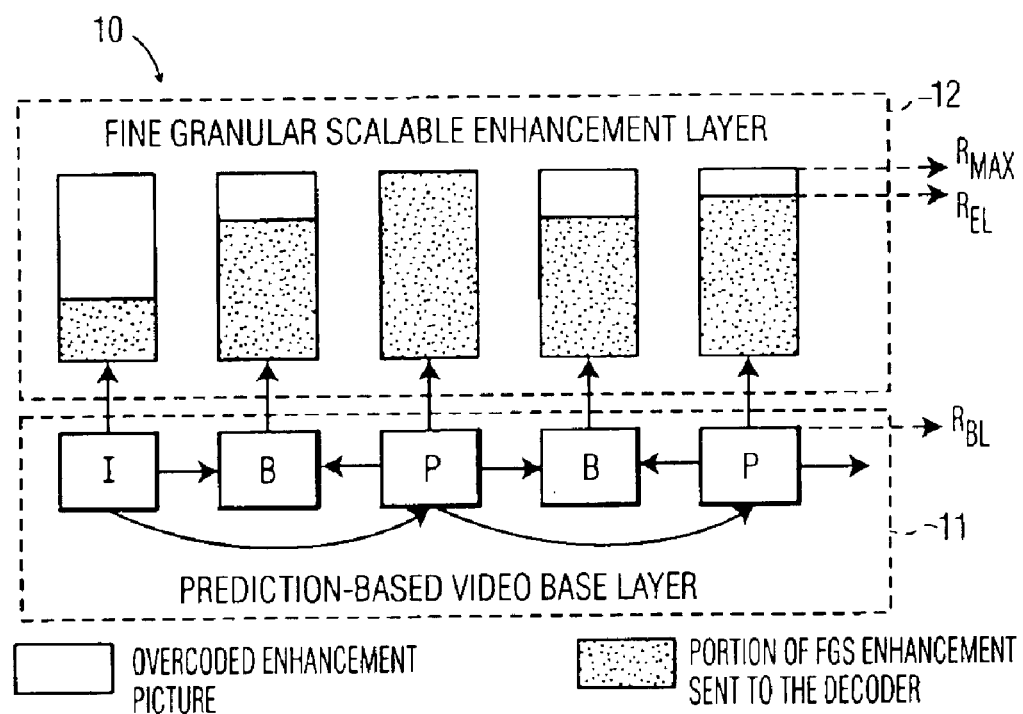
FIG. 1 shows a current enhancement layer video coding scheme.
Figure 2:
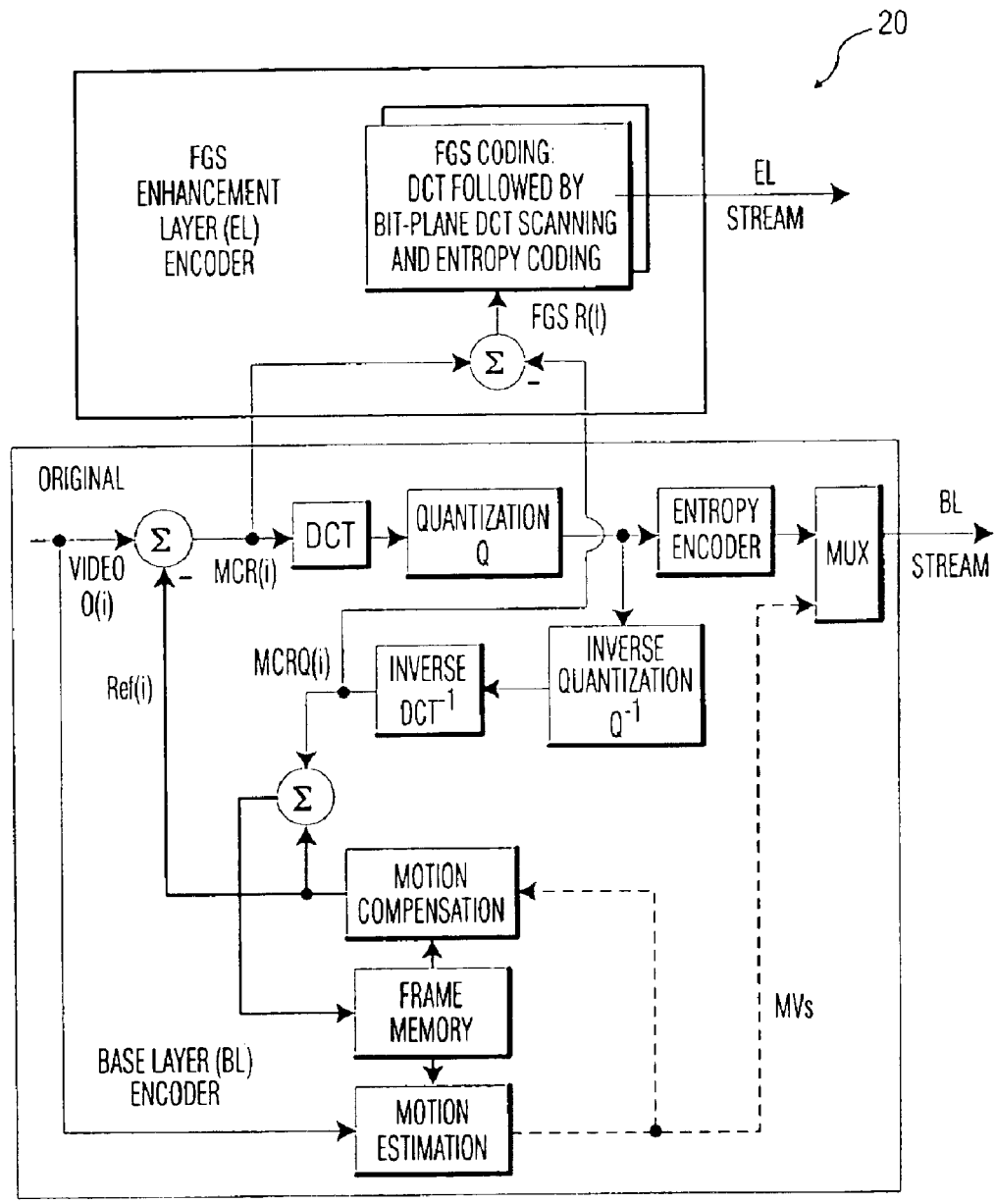
FIG. 2 shows a block-diagram of a conventional encoder for coding the base layer and enhancement layer of the video coding scheme of FIG. 1.

The prediction-based base layer 31 includes intraframe coded I frames, interframe coded predicted P-frames, and interframe coded bi-directional predicted B-frames, as in the conventional enhancement layer video scheme presented in FIG. 1. The base layer I-, P- and B-frames may be coded using conventional non-scalable frame-prediction coding techniques. (The base layer I-frames are of course not motion-predicted.)

The two-loop prediction-based enhancement layer 32 includes non-motion-predicted enhancement layer I- and P-frames and motion-predicted enhancement layer B-frames. The non-motion-predicted enhancement layer I- and P-frames are derived conventionally by subtracting their respective reconstructed (decoded) base layer I- and P-frame residuals from their respective original base layer I- and P-frame residuals.

In accordance with the present invention, the motion-predicted enhancement layer B-frames are each computed using: 1) motion-prediction from two temporally adjacent differential I- and P- or P- and P-frame residuals (a.k.a. enhancement layer frames), and 2) the differential B-frame residual obtained by subtracting the decoded base layer B-frame residual from the original base layer B-frame residual. The difference between 2) the differential B-frame residual and 1) the B-frame motion prediction obtained from the two temporally adjacent motion-compensated differential frame residuals provide a motion-predicted enhancement layer B-frame in the Enhancement Layer 32. Both the motion-predicted enhancement layer B frames resulting from this process and the non-motion-predicted enhancement layer I- and P- frames may be coded with any suitable scalable codec, preferably a fine granular scalable (FGS) codec as shown in FIG. 3A.

The video coding scheme 30 of the present invention improves the video image quality because it reduces temporal redundancy in the enhancement layer B-frames of the enhancement layer 32. Since the enhancement layer B-frames account for 66% of the total bit-rate budget for the enhancement layer 32 in an IBBP group of pictures (GOP) structure, the loss in image quality associated with performing motion compensation only for the enhancement layer B-frames is very limited for most video sequences. (In conventional enhancement layer video coding schemes, a popular rate-control is mostly performed within the enhancement layer by allocating an equal number of bits to all enhancement layer I-, P-, and B-frames.)

Further, it is important to note that rate-control plays an important role for achieving good performance with the video coding scheme of the present invention. However, even a simplistic approach which allocates the total bit-budget Btot for a GOP according to Btot=bI*No._I_frames+bP*No._P_frames+bB*No._B_frames, where bI>bP>bB, already provides very good results. Further note that a different number of enhancement layer bits/bitplanes (does not have to be an integer number of bits/bitplanes) can be considered for each enhancement layer reference frame used in the motion compensation loops. Moreover, if desired, only certain parts or frequencies within the enhancement layer reference frame need be incorporated in the enhancement layer motion-compensation loop.

The packet-loss robustness of the above scheme is similar to that of the current enhancement layer coding scheme of FIG. 1: if an error occurs in a motion-predicted enhancement layer B-frame, this error will not propagate beyond the next received I- or P-frame. Two packet-loss scenarios can occur:

If an error occurs in the motion-predicted enhancement layer B-frame, the error is confined to that B-frame;

If an error occurs in an enhancement layer I- or P-frame, the error will not go beyond the (two) motion-predicted enhancement layer B-frames using these enhancement layer frames as references. Then, either one of the motion-predicted enhancement layer B-frames can be discarded and frame-repetition applied or error concealment can be applied using the other uncorrupted reference enhancement layer frame.

Figure 4:
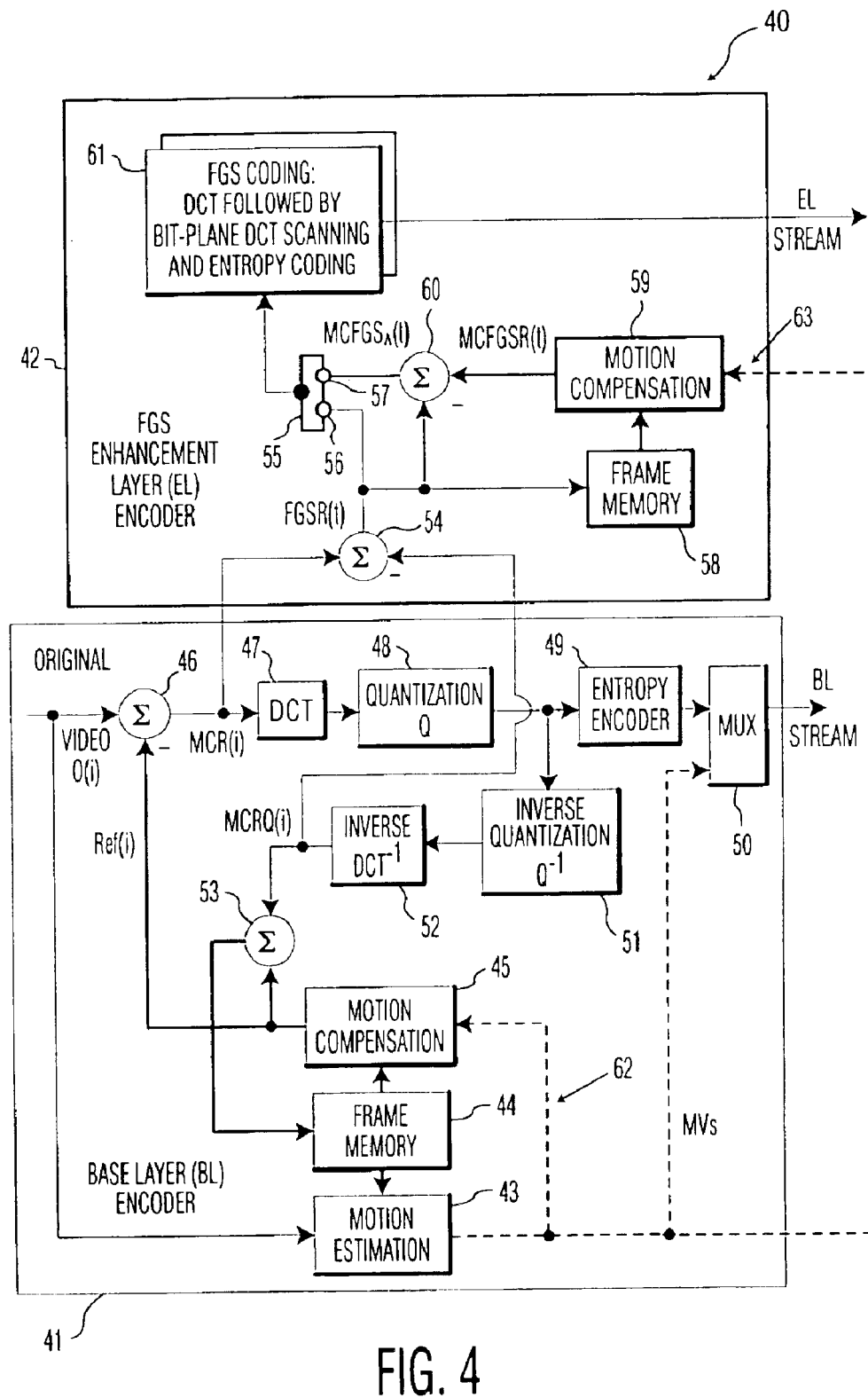
FIG. 4 shows a block-diagram of an encoder, according to an exemplary embodiment of the present invention, that may be used for generating the enhancement layer video coding scheme of FIG. 3A.

FIG. 4 shows a block-diagram of an encoder 40, according to an exemplary embodiment of the present invention, that may be used for generating the enhancement layer video coding scheme of FIG. 3A. As can be seen, the encoder 40 includes a base layer encoder 41 and an enhancement layer encoder 42. The base layer encoder 41 is conventional and includes a motion estimator 43 that generates motion information (motion vectors and prediction modes) from the original video sequence and appropriate reference frame stored in memory 44. A first motion compensator 45 in a first motion compensation loop 62, processes the motion information and generates motion-compensated base layer reference frames (Ref(i)). A first subtractor 46 subtracts the motion-compensated base layer reference frames Ref(i) from the original video sequence to generate motion-compensated residuals of the base layer frames MCR(i). The motion-compensated residuals of the base layer frames MCR(i) are processed by a discrete cosine transform (DCT) encoder 47, a quantizer 48, and an entropy encoder 49 into a portion of a compressed base layer stream (base layer frames) from the original video sequence. The motion information generated by the motion estimator 43 is also combined, via a multiplexer 50, with the portion of the base layer stream processed by the first subtractor 46, DCT encoder 47, quantizer 48 and entropy encoder 49. The quantized motion-compensated residual of the base layer frames MCR(I) generated at the output of the quantizer 48 are dequantized by an inverse quantizer 51, and then inverse DCT transformed via an inverse DCT unit 52. This process generates quantized-and-dequantized versions of the motion-compensated residuals of the base layer frames MCRQ(i), at the output of the inverse DCT 52. The quantized-and-dequantized motion-compensated residuals of the base layer frames MCRQ(i) and their respective motion-compensated base layer reference frames Ref(i) are summed in an adder 53 to generate new reference frames that are stored in the first frame memory 44 and used by the motion estimator 43 and motion compensator 45 for processing other frames.

Still referring to FIG. 4, the enhancement layer encoder 42, which preferably comprises an FGS enhancement layer encoder (as shown in FIG. 4), includes a second subtractor 54 that computes the difference between the motion-compensated residuals of the base layer frames MCR(i) and the quantized-and-dequantized motion-compensated residuals of the base layer frames MCRQ(i) to generate differential I-, P-, and B-frame residuals FGSR(i), which in the case of the I- and P-frame residuals, are the enhancement layer I- and P-frames. A frame flow control device 55 is provided for enabling the differential I- and P-frame residuals to be processed conventionally while the differential B-frame residuals are processed with motion-compensation in the enhancement layer in accordance with the principles of the present invention. The frame flow control device 55 accomplishes this task by causing the data flow at the output of the second subtractor 54 to stream in a different manner in accordance with the type of frame that is outputted by the second subtractor 54. More specifically, differential I- and P-frame residuals generated at the output of the second subtractor 54 are routed by the frame control device 55 to an FGS encoder 61 (or like scalable encoder) for FGS coding using conventional DCT encoding followed by bit-plane DCT scanning and entropy encoding to generate a portion (non-motion-predicted enhancement layer I- and P-frames) of a compressed enhancement layer stream. The differential I- and P-frame residuals generated at the output of the second subtractor 54 are also routed to a second frame memory 58 where they are used later on for motion-compensation. The differential B-frame residuals generated at the output of the second subtractor 54 are routed by the frame control device 55 to a third subtractor 60 and the second frame memory 58. A second motion compensator 59 in second motion compensation loop 63, reuses the motion information from the original video sequence (the output of the motion estimator 43 of the base layer encoder 41) and the differential I- and P-frame residuals stored in the second frame memory 58, which are used as references, to generate reference motion-compensated differential (I- and P- or P- and P-) frame residuals MCFGSR(i). Note that only a portion of each reference differential I- and P-frame residual e.g. several bit-planes, is required, although the entire reference differential frame residual can be used if desired. The third subtractor 60 generates each motion-predicted enhancement layer B-frame MCFGS(i) by subtracting the reference motion-compensated differential (I- and P- or P- and P-) frame residual MCFGSR(i) from its respective differential B-frame residual FGSR(i). The frame flow control device 55 routes the motion-predicted enhancement layer B-frames MCFGS(i) to the FGS encoder 61 for FGS coding using conventional DCT encoding followed by bit-plane DCT scanning and entropy encoding where they are added to the compressed enhancement layer stream.

As should now be apparent, the base layer remains unchanged in the enhancement layer video coding scheme of FIG. 3A. Moreover, the enhancement layer I- and P-frames are processed in substantially the same manner as in the current FGS video coding scheme of FIG. 1, therefore, these frames are not motion-predicted within the enhancement layer. In the case of the motion-predicted enhancement layer B-frames, it should be apparent now that the signal to be coded in the enhancement layer of the $i^{th}$ frame MCFGS equals:

$$MCFGS(i)=FGSR(i)-MCFGSR(i)=MCR(i)-MCRQ(i)-MCFGSR(i)$$

where MCR(i) is the motion-compensated residual of frame i after the quantization and the dequantization processes, FGSR(i) is substantially identical to the current FGS video coding scheme of FIG. 1, i.e., FGSR(i) equals MCR(i)−MCRQ(i), and MCFGSR(i) is the reference motion-compensated differential frame residual for frame (i). It should be noted that enhancement layer B-frame processing method of the present invention merely requires an additional motion-compensation loop in the enhancement layer for providing motion-predicted enhancement layer B-frames.

Figure 6:
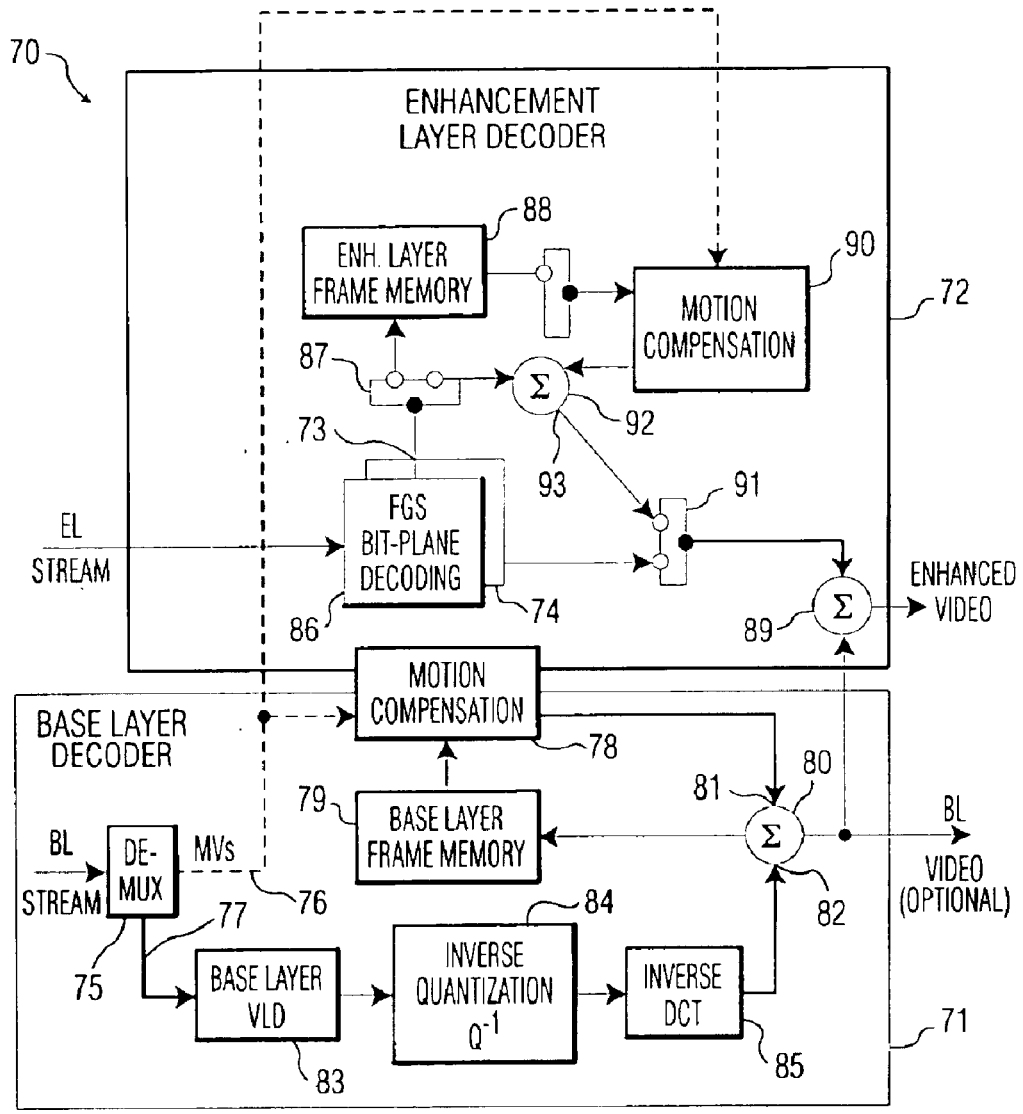
FIG. 6 shows a block-diagram of a decoder, according to an exemplary embodiment of the present invention, that may be used for decoding the compressed base layer and enhancement layer streams generated by the encoder of FIG. 4.

FIG. 6 shows a block-diagram of a decoder 70, according to an exemplary embodiment of the present invention, that may be used for decoding the compressed base layer and enhancement layer streams generated by the encoder 40 of FIG. 4. As can be seen, the decoder 70 includes a base layer decoder 71 and an enhancement layer decoder 72. The base layer decoder 71 includes a demultiplexer 75 which receives the encoded base layer stream and demultiplexes the stream into first and second data streams 76 and 77. The first data stream 76, which includes motion information (motion vectors and motion prediction modes), is applied to a first motion compensator 78. The motion compensator 78 uses the motion information and base layer reference video frames stored in an associated base layer frame memory 79 to generate motion-predicted base layer P- and B-frames that are applied to a first input 81 of a first adder 80. The second data stream 77 is applied to a base layer variable length code decoder 83 for decoding, and to an inverse quantizer 84 for dequantizing. The dequantized code is applied to an inverse DCT decoder 85 where the dequantized code is transformed into base layer residual video I-, P- and B-frames which are applied to a second input 82 of the first adder 80. The base layer residual video frames and motion-predicted base layer frames generated by the motion compensator 78 are summed in the first adder 80 to generate base layer video I-, P-, and B-frames that are stored in the base layer frame memory 79 and optionally outputted as a base layer video.

The enhancement layer decoder 72 includes an FGS bit-plane decoder 86 or like scalable decoder that decodes the compressed enhancement layer stream to generate at first and second outputs 73 and 74 the differential I-, P-, and B-frame residuals which are respectively applied to first and second frame flow control devices 87 and 91. The first and second frame flow control devices 87 and 91 enable the differential I- and P-frame residuals to be processed differently from the differential B-frame residuals by causing the data flow at the outputs 73 and 74 of the FGS bit-plane decoder 86 to stream in a different manner in accordance with the type of enhancement layer frame that is outputted by the decoder 86. The differential I- and P-frame residuals at the first output 73 of the FGS bit-plane decoder 86 are routed by the first frame control device 87 to an enhancement layer frame memory 88 where they are stored and used later on for motion compensation. The differential B-frame residuals at the first output 73 of the FGS bit-plane decoder 86 are routed by the first frame control device 87 to a second adder 92 and processed as will be explained further on.

A second motion compensator 90 reuses the motion information received by the base layer decoder 71 and the differential I- and P-frame residuals stored in the enhancement layer frame memory 88 to generate reference motion-compensated differential (I- and P- or P- and P-) frame residuals, which are used for predicting enhancement layer B-frames. The second adder 92 sums each reference motion-compensated differential frame residual and its respective differential B-frame residual to generate an enhancement layer B-frame.

The second frame control device 91 sequentially routes the enhancement layer I- and P-frames (the differential I- and P-frame residuals) at the second output 74 of the FGS bit-plane decoder 86 and the motion-predicted enhancement layer B-frames at the output 93 of the second adder 92 to a third adder 89. The third adder 89 sums the enhancement layer I,-, P-, and B-frames together with their corresponding base layer I-, P-, and B-frames to generate an enhanced video.

Figure 3B:
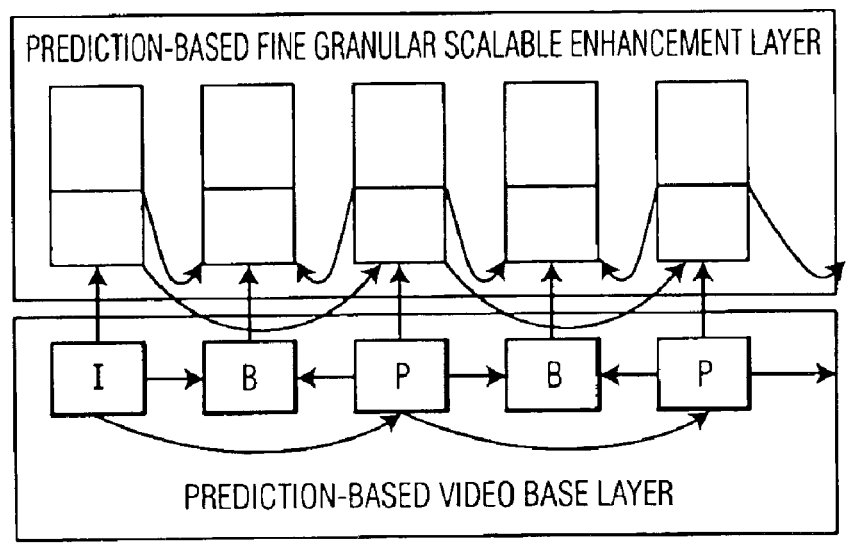
FIG. 3B shows an enhancement layer video coding scheme according to a second exemplary embodiment of the present invention.

FIG. 3B shows an enhancement layer video coding scheme 100 according to a second exemplary embodiment of the present invention. As can be seen, the video coding scheme 100 of the second embodiment is substantially identical to the first embodiment of FIG. 3A except that the enhancement layer P-frames in the two-loop prediction-based enhancement layer 132 are motion-predicted like the enhancement layer B-frames.

The motion-predicted enhancement layer P-frames are computed in a manner similar to the enhancement B-frames i.e., each motion-predicted enhancement layer P-frame is computed using: 1) motion-prediction from a temporally adjacent differential I- or P-frame residual, and 2) the differential P-frame residual obtained by subtracting the decoded base layer P-frame residual from the original base layer P-frame residual. The difference between 2) the differential P-frame residual and 1) the P-frame motion prediction obtained from the temporally adjacent motion-compensated differential frame residual provide a motion-predicted enhancement layer P-frame in the Enhancement Layer 132. Both the motion-predicted enhancement layer P-and B-frames resulting from this process and the non-motion-predicted enhancement layer I-frames may be coded with any suitable scalable codec, preferably a fine granular scalable (FGS) codec as shown in FIG. 3B.

The video coding scheme 100 of FIG. 3B provides further improvements in the video image quality. This is because the video coding scheme 100 reduces temporal redundancy in both the P- and B-frames of the enhancement layer 132.

The video coding schemes of the present invention can be alternated with the current video coding scheme of FIG. 1 for the various portions of a video sequence or for various video sequences. Additionally, switching between all three video coding schemes i.e., current video coding scheme of FIG. 1 and the video coding schemes described in FIGS. 3A and 3B, can be done based on channel characteristics and can be performed at encoding or at transmission time. Further the video coding schemes of the present invention achieve a large gain in coding efficiency with only a limited increase in complexity.

Figure 5:
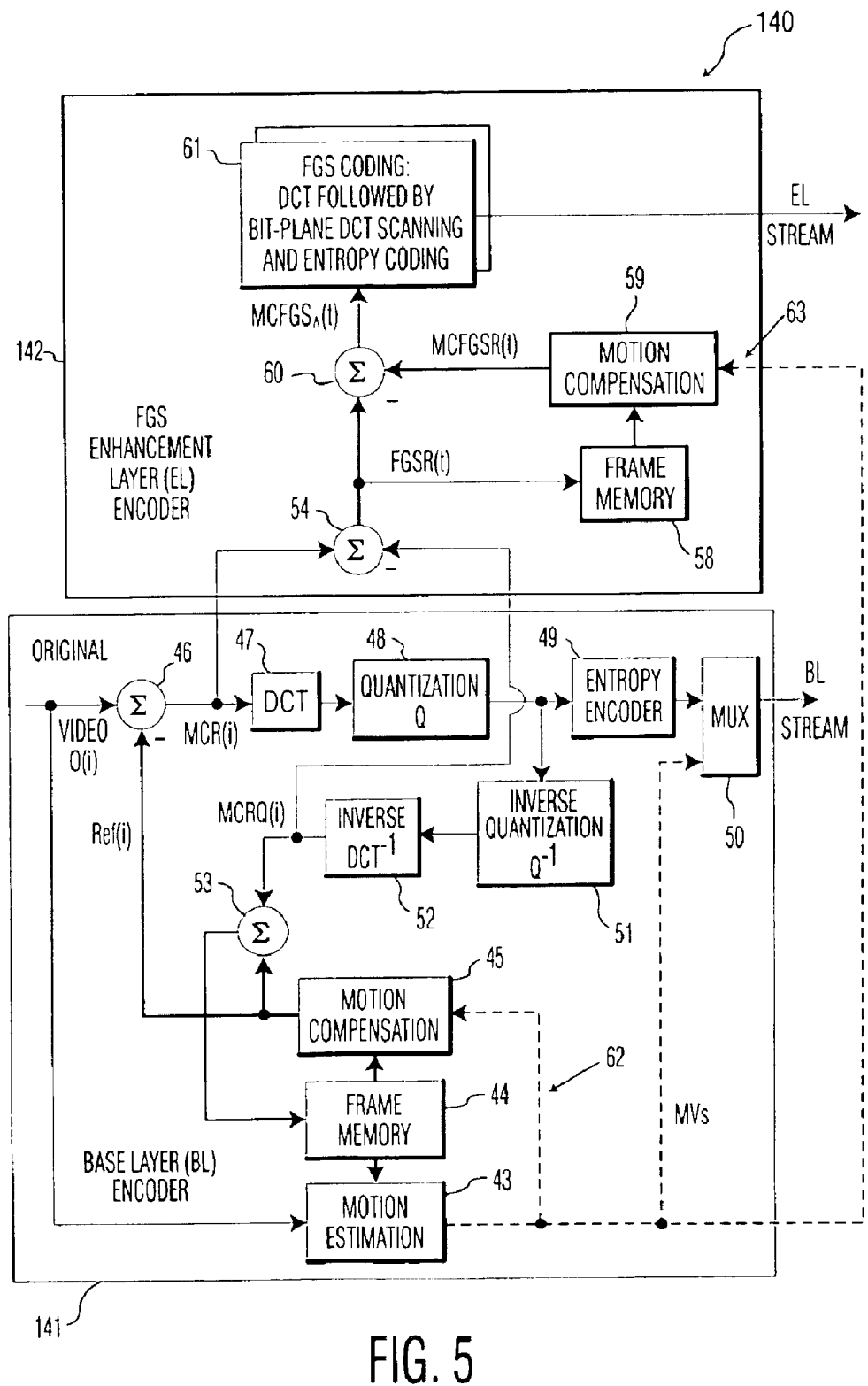
FIG. 5 shows a block-diagram of an encoder, according to an exemplary embodiment of the present invention, that may be used for generating the enhancement layer video coding scheme of FIG. 3B.

FIG. 5 shows a block-diagram of an encoder 140, according to an exemplary embodiment of the present invention, that may be used for generating the enhancement layer video coding scheme of FIG. 3B. As can be seen, the encoder 140 of FIG. 5 is substantially identical to the encoder 40 of FIG. 4 (which is used for generating the enhancement layer video coding scheme of FIG. 3A), except that the frame flow control device 55 used in the encoder 40 is omitted. The frame flow control device is not necessary in this encoder 140 because the differential I-frame residuals are not processed with motion-compensation and thus, do not need to be routed differently from the differential P- and B-frame residuals in the enhancement layer encoder 142.

Hence, the differential I-frame residuals generated at the output of the second subtractor 54 pass to an FGS encoder 61 for FGS coding using conventional DCT encoding followed by bit-plane DCT scanning and entropy encoding to generate a portion (non-motion-predicted enhancement layer I-frames) of a compressed enhancement layer stream. The differential I-frame residuals also pass to a second frame memory 58 along with the differential P-frame residuals where they are used later on for motion-compensation. The differential P- and B-frame residuals generated at the output of the second subtractor 54 are also passed to a third subtractor 60. A second motion compensator 59 in second motion compensation loop 63, reuses the motion information from the original video sequence (the output of the motion estimator 43 of the base layer encoder 41) and the differential I- and P-frame residuals stored in the second frame memory 58, which are used as references, to generate reference motion-compensated differential (I or P) frame residuals MCFGSR(i) for motion-predicting enhancement layer P-frames and reference (I- and P- or P- and P-) frame residuals MCFGSR(i) for motion-predicting enhancement layer B-frames. The third subtractor 60 generates each motion-predicted enhancement layer P- or B-frame MCFGS (i) by subtracting the reference motion-compensated differential (I or P) or (I- and P- or P- and P-) frame residual MCFGSR(i) from its respective differential P- or B-frame residual FGSR(i). The motion-predicted enhancement layer P- and B-frames MCFGS(i) then pass to the FGS encoder 61 for FGS coding using conventional DCT encoding followed by bit-plane DCT scanning and entropy encoding where they are added to the compressed enhancement layer stream.

As in the video coding scheme of FIG. 3A, the base layer remains unchanged in the enhancement layer video coding scheme of FIG. 3B. Moreover, it should be noted that enhancement layer P- and B-frame processing method of the present invention merely requires an additional motion-compensation loop in the enhancement layer for providing motion-predicted enhancement layer P- and B-frames.

Figure 7:
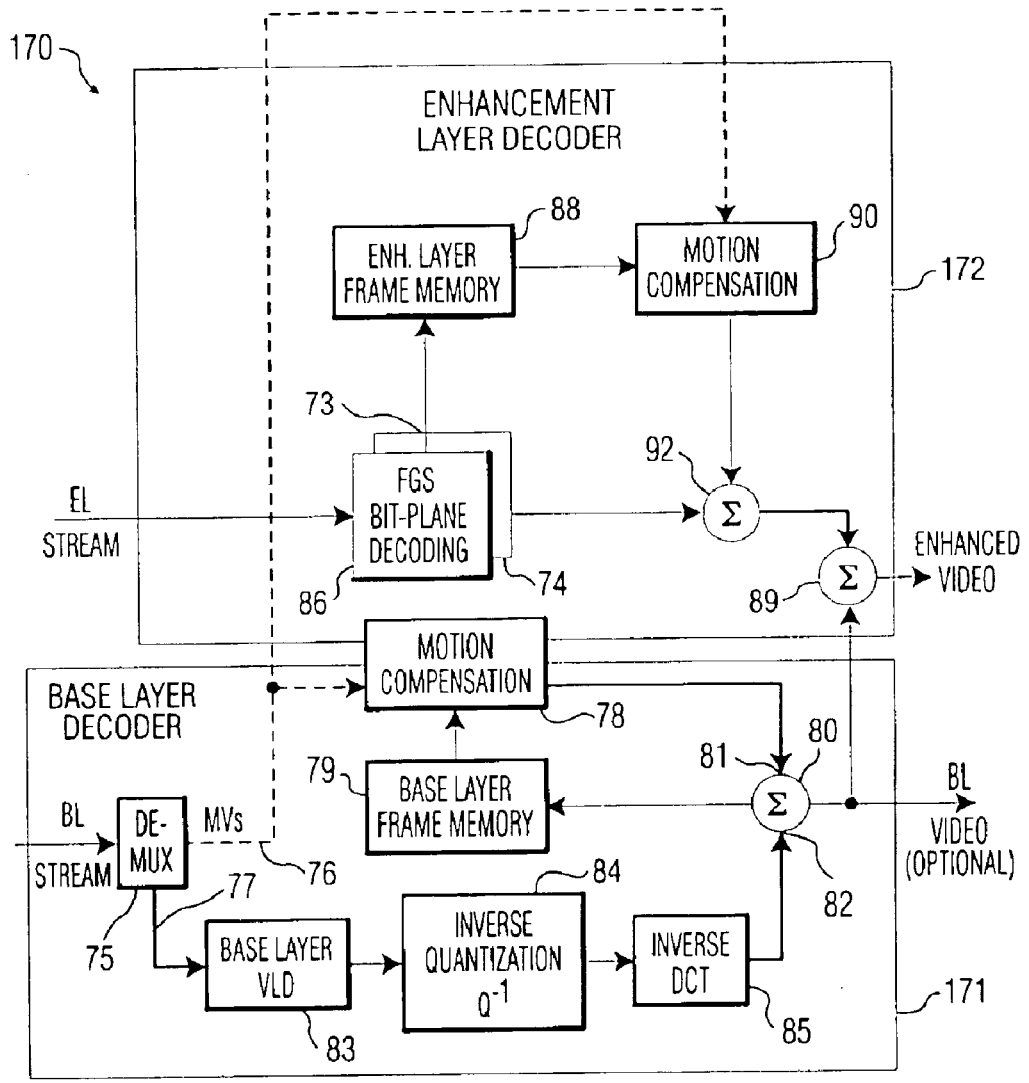
FIG. 7 shows a block-diagram of a decoder, according to an exemplary embodiment of the present invention, that may be used for decoding the compressed base layer and enhancement layer streams generated by the encoder of FIG. 5.

FIG. 7 shows a block-diagram of a decoder 170, according to an exemplary embodiment of the present invention, that may be used for decoding the compressed base layer and enhancement layer streams generated by the encoder 140 of FIG. 5. As can be seen, the decoder 170 of FIG. 7 is substantially identical to the decoder 70 of FIG. 6, except that the frame flow control devices 87 and 91 used in the decoder 70 are omitted. The frame flow control devices are not necessary in this decoder 170 because the differential I-frame residuals are not processed with motion-compensation and thus, do not need to be routed differently from the decoded differential P- and B-frame residuals in the enhancement layer decoder 172.

Accordingly, the differential I- and P-frame residuals at the first output 73 of the FGS bit-plane decoder 86 pass to the enhancement layer frame memory 88 where they are stored and used later on for motion compensation. The differential P- and B-frame residuals at the second output 74 of the FGS bit-plane decoder 86 pass to a second adder 92. The differential I-frame residuals (enhancement layer I-frames hereinafter) at the second output 74 of the FGS bit-plane decoder 86 pass to a third adder 89, the purpose of which will be explained further on. The second motion compensator 90 reuses the motion information received by the base layer decoder 71 and the differential I- and P-frame residuals stored in the enhancement layer frame memory 88 to generate 1) reference motion-compensated differential (I- and P- or P- and P-) frame residuals, which are used for predicting enhancement layer B-frames, and 2) reference motion-compensated differential (I-or P-) frame residuals, which are used for predicting enhancement layer P-frames. The second adder 92 sums the reference motion-compensated differential frame residuals with their respective differential B-frame residuals or P-frame residuals to generate enhancement layer B- and P-frames. The third adder 89 sums the enhancement layer I,-, P-, and B-frames together with their corresponding base layer I-, P-, and B-frames to generate an enhanced video.

Figure 8:
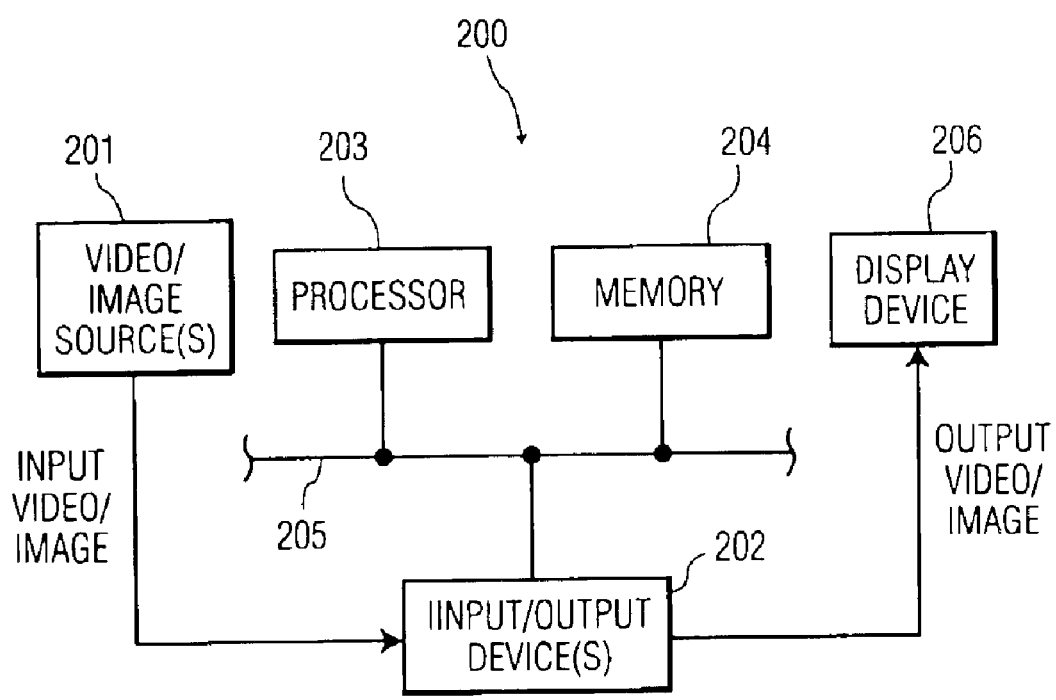
FIG. 8 shows an exemplary embodiment of a system which may be used for implementing the principles of the present invention.

FIG. 8 shows an exemplary embodiment of a system 200 which may be used for implementing the principles of the present invention. The system 200 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system 200 includes one or more video/image sources 201, one or more input/output devices 202, a processor 203 and a memory 204. The video/image source(s) 201 may represent, e.g., a television receiver, a VCR or other video/image storage device. The source(s) 201 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 202, processor 203 and memory 204 may communicate over a communication medium 205. The communication medium 205 may represent, e.g., a bus, a communication network, one or more internal connections of a circuit, circuit card or other device, as well as portions and combinations of these and other communication media. Input video data from the source(s) 201 is processed in accordance with one or more software programs stored in memory 204 and executed by processor 203 in order to generate output video/images supplied to a display device 206.

In a preferred embodiment, the coding and decoding employing the principles of the present invention may be implemented by computer readable code executed by the system. The code may be stored in the memory 204 or read/downloaded from a memory medium such as a CD-ROM or floppy disk. In other embodiments, hardware circuitry may be used in place of, or in combination with, software instructions to implement the invention. For example, the elements shown in FIGS. 4–7 may also be implemented as discrete hardware elements.

While the present invention has been described above in terms of specific embodiments, it is to be understood that the invention is not intended to be confined or limited to the embodiments disclosed herein. For example, other transforms besides DCT can be employed, including but not limited to wavelets or matching-pursuits. In another example, although motion-compensation is accomplished in the above embodiments by reusing motion data from the base layer, other embodiments of the invention can employ an additional motion estimator in the enhancement layer, which would require sending additional motion vectors. In still another example, other embodiments of the invention may employ motion compensation in the enhancement layer for just the P-frames. These and all other such modifications and changes are considered to be within the scope of the appended claims.

What is claimed is:

1. A method of coding video, comprising the steps of:
   coding an uncoded video with a non-scalable codec to generate base layer frames;
   computing differential frame residuals from the uncoded video and the base layer frames, at least portions of certain ones of the differential frame residuals being operative as references;
   applying motion-compensation to the at least portions of the differential frame residuals that are operative as references to generate reference motion-compensated differential frame residuals; and
   subtracting the reference motion-compensated differential frame residuals from respective ones of the differential frame residuals to generate motion-predicted enhancement layer frames.

2. A method of coding video according to claim 1, further comprising the step of coding the motion-predicted enhancement layer frames with a scalable codec.

3. A method of coding video according to claim 1, further comprising the step of coding the motion-predicted enhancement layer frames with a fine granular scalable codec.

4. A method of coding video according to claim 1, wherein the motion-predicted enhancement layer frames in the subtracting step include motion-predicted enhancement layer B-frames, the reference motion-compensated differential frame residuals in the subtracting step include reference motion-compensated differential I- and P-frame residuals or reference motion-compensated differential P- and P-frame residuals, and the respective ones of the differential frame residuals in the subtracting step include differential B-frames.

5. A method of coding video according to claim 4, wherein the motion-predicted enhancement layer frames in the subtracting step further include motion-predicted enhancement layer P-frames, the reference motion-compensated differential frame residuals in the subtracting step further include reference motion-compensated differential I-frame residuals or reference motion-compensated P-frame residuals, and the respective ones of the differential frame residuals in the subtracting step further include differential P-frames.

6. A method of coding video according to claim 1, wherein the motion-predicted enhancement layer frames in the subtracting step include motion-predicted enhancement layer P-frames, the reference motion-compensated differential frame residuals in the subtracting step include reference motion-compensated differential I-frame residuals or reference motion-compensated P-frame residuals, and the respective ones of the differential frame residuals in the subtracting step include differential P-frames.

7. A method of decoding a compressed video having a base layer stream and an enhancement layer stream, the method comprising the steps of:
   decoding the base layer stream to generate base layer video frames;
   decoding the enhancement layer stream to generate differential frame residuals, at least portions of certain ones of the differential frame residuals being operative as references;
   applying motion-compensation to the at least portions of the differential frame residuals operative as references to generate reference motion-compensated differential frame residuals;
   adding the reference motion-compensated differential frame residuals with respective ones of the differential frame residuals to generate motion-predicted enhancement layer frames; and
   combining the motion-predicted enhancement layer frames with respective ones of the base layer frames to generate an enhanced video.

8. A method of decoding video according to claim 7, wherein the motion-predicted enhancement layer frames in the adding step consist of motion-predicted enhancement layer B-frames, the reference motion-compensated differential frame residuals in the adding step consist of reference motion-compensated differential I- and P-frame residuals or reference motion-compensated differential P- and P-frame residuals, and the respective ones of the differential frame residuals in the adding step consist of differential B-frames.

9. A method of decoding video according to claim 7, wherein the motion-predicted enhancement layer frames in the adding step include motion-predicted enhancement layer B-frames, the reference motion-compensated differential frame residuals in the adding step include reference motion-compensated differential I- and P-frame residuals or reference motion-compensated differential P- and P-frame residuals, and the respective ones of the differential frame residuals in the adding step include differential B-frames.

10. A method of decoding video according to claim 9, wherein the motion-predicted enhancement layer frames in the adding step further include motion-predicted enhancement layer P-frames, the reference motion-compensated differential frame residuals in the adding step further include reference motion-compensated differential I-frame residuals or reference motion-compensated P-frame residuals, and the respective ones of the differential frame residuals in the adding step further include differential P-frames.

11. A method of decoding video according to claim 7, wherein the motion-predicted enhancement layer frames in the adding step include motion-predicted enhancement layer P-frames, the reference motion-compensated differential frame residuals in the adding step include reference motion-compensated differential I-frame residuals or reference motion-compensated P-frame residuals, and the respective ones of the differential frame residuals in the adding step include differential P-frames.

12. A memory medium for encoding video, the memory medium comprising:
   code for non-scalable encoding an uncoded video into base layer frames;
   code for computing differential frame residuals from the uncoded video and the base layer frames, at least portions of certain ones of the differential frame residuals being operative as references;

code for applying motion-compensation to the at least portions of the differential frame residuals that are operative as references to generate reference motion-compensated differential frame residuals; and code for subtracting the reference motion-compensated differential frame residuals from respective ones of the differential frame residuals to generate motion-predicted enhancement layer frames.

13. A memory medium for encoding video according to claim 12, further comprising code for scalable encoding the motion-predicted enhancement layer frames.

14. A memory medium for encoding video according to claim 12, further comprising code for fine granular scalable encoding the motion-predicted enhancement layer frames.

15. A memory medium for encoding video according to claim 12, wherein the motion-predicted enhancement layer frames include motion-predicted enhancement layer B-frames, the reference motion-compensated differential frame residuals include reference motion-compensated differential I- and P-frame residuals or reference motion-compensated differential P- and P-frame residuals, and the respective ones of the differential frame residuals include differential B-frames.

16. A memory medium for encoding video according to claim 15, wherein the motion-predicted enhancement layer frames further include motion-predicted enhancement layer P-frames, the reference motion-compensated differential frame residuals further include reference motion-compensated differential I-frame residuals or reference motion-compensated P-frame residuals, and the respective ones of the differential frame residuals further include differential P-frames.

17. A memory medium for encoding video according to claim 12, wherein the motion-predicted enhancement layer frames include motion-predicted enhancement layer P-frames, the reference motion-compensated differential frame residuals include reference motion-compensated differential I-frame residuals or reference motion-compensated P-frame residuals, and the respective ones of the differential frame residuals include differential P-frames.

18. A memory medium for decoding a compressed video having a base layer stream and an enhancement layer stream, the memory medium comprising:

code for decoding the base layer stream to generate base layer video frames;

code for decoding the enhancement layer stream to generate differential frame residuals, at least portions of certain ones of the differential frame residuals being operative as references;

code for applying motion-compensation to the at least portions of the differential frame residuals operative as references to generate reference motion-compensated differential frame residuals;

code for adding the reference motion-compensated differential frame residuals with respective ones of the differential frame residuals to generate motion-predicted enhancement layer frames; and code for combining the motion-predicted enhancement layer frames with respective ones of the base layer frames to generate an enhanced video.

19. A memory medium for decoding a compressed video according to claim 18, wherein the motion-predicted enhancement layer frames include motion-predicted enhancement layer B-frames, the reference motion-compensated differential frame residuals include reference motion-compensated differential I- and P-frame residuals or reference motion-compensated differential P- and P-frame residuals, and the respective ones of the differential frame residuals include differential B-frames.

20. A memory medium for decoding a compressed video according to claim 19, wherein the motion-predicted enhancement layer frames further include motion-predicted enhancement layer P-frames, the reference motion-compensated differential frame residuals further include reference motion-compensated differential I-frame residuals or reference motion-compensated P-frame residuals, and the respective ones of the differential frame residuals further include differential P-frames.

21. A memory medium for decoding a compressed video according to claim 18, wherein the motion-predicted enhancement layer frames include motion-predicted enhancement layer P-frames, the reference motion-compensated differential frame residuals include reference motion-compensated differential I-frame residuals or reference motion-compensated P-frame residuals, and the respective ones of the differential frame residuals include differential P-frames.

22. An apparatus for coding video, the apparatus comprising:

means for non-scalable coding an uncoded video to generate base layer frames;

means for computing differential frame residuals from the uncoded video and the base layer frames, at least portions of certain ones of the differential frame residuals being operative as references;

means for applying motion-compensation to the at least portions of the differential frame residuals that are operative as references to generate reference motion-compensated differential frame residuals; and means for subtracting the reference motion-compensated differential frame residuals from respective ones of the differential frame residuals to generate motion-predicted enhancement layer frames.

23. An apparatus for coding video according to claim 22, further comprising means for scalable coding the motion-predicted enhancement layer frames.

24. An apparatus for coding video according to claim 22, further comprising means for fine granular scalable coding the motion-predicted enhancement layer frames.

25. An apparatus for coding video according to claim 22, wherein the motion-predicted enhancement layer frames include motion-predicted enhancement layer B-frames, the reference motion-compensated differential frame residuals include reference motion-compensated differential I- and P-frame residuals or reference motion-compensated differential P- and P-frame residuals, and the respective ones of the differential frame residuals include differential B-frames.

26. An apparatus for coding video according to claim 25, wherein the motion-predicted enhancement layer frames further include motion-predicted enhancement layer P-frames, the reference motion-compensated differential frame residuals further include reference motion-compensated differential I-frame residuals or reference motion-compensated P-frame residuals, and the respective ones of the differential frame residuals further include differential P-frames.

27. An apparatus for coding video according to claim 22, wherein the motion-predicted enhancement layer frames include motion-predicted enhancement layer P-frames, the reference motion-compensated differential frame residuals include reference motion-compensated differential I-frame residuals or reference motion-compensated P-frame residuals, and the respective ones of the differential frame residuals include differential P-frames.

28. An apparatus for decoding a compressed video having a base layer stream and an enhancement layer stream, the apparatus comprising:
- means for decoding the base layer stream to generate base layer video frames;
- means for decoding the enhancement layer stream to generate differential frame residuals, at least portions of certain ones of the differential frame residuals being operative as references;
- means for applying motion-compensation to the at least portions of the differential frame residuals operative as references to generate reference motion-compensated differential frame residuals;
- means for adding the reference motion-compensated differential frame residuals with respective ones of the differential frame residuals to generate motion-predicted enhancement layer frames; and
- means for combining the motion-predicted enhancement layer frames with respective ones of the base layer frames to generate an enhanced video.

29. An apparatus for decoding a compressed video according to claim 28, wherein the motion-predicted enhancement layer frames include motion-predicted enhancement layer B-frames, the reference motion-compensated differential frame residuals include reference motion-compensated differential I- and P-frame residuals or reference motion-compensated differential P- and P-frame residuals, and the respective ones of the differential frame residuals include differential B-frames.

30. An apparatus for decoding a compressed video according to claim 29, wherein the motion-predicted enhancement layer frames further include motion-predicted enhancement layer P-frames, the reference motion-compensated differential frame residuals further include reference motion-compensated differential I-frame residuals or reference motion-compensated P-frame residuals, and the respective ones of the differential frame residuals further include differential P-frames.

31. An apparatus for decoding a compressed video according to claim 28, wherein the motion-predicted enhancement layer frames include motion-predicted enhancement layer P-frames, the reference motion-compensated differential frame residuals include reference motion-compensated differential I-frame residuals or reference motion-compensated P-frame residuals, and the respective ones of the differential frame residuals include differential P-frames.

* * * * *